United States Patent
Nebe et al.

(10) Patent No.: US 9,840,441 B2
(45) Date of Patent: Dec. 12, 2017

(54) COMPOSITION FOR PRODUCING A SHAPED REFRACTORY CERAMIC PRODUCT, A METHOD FOR PRODUCING A SHAPED REFRACTORY CERAMIC PRODUCT, AND A SHAPED REFRACTORY CERAMIC PRODUCT

(71) Applicant: Refractory Intellectual Property GmbH & Co. KG, Vienna (AT)

(72) Inventors: Ulrich Nebe, Hungen (DE); Roland Nilica, Feistritz (AT); Barbara Zluc, Leoben (AT)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 0 days.

(21) Appl. No.: 15/107,345

(22) PCT Filed: Jan. 20, 2015

(86) PCT No.: PCT/EP2015/050989
§ 371 (c)(1),
(2) Date: Jun. 22, 2016

(87) PCT Pub. No.: WO2015/149956
PCT Pub. Date: Oct. 8, 2015

(65) Prior Publication Data
US 2017/0022114 A1    Jan. 26, 2017

(30) Foreign Application Priority Data
Apr. 3, 2014 (EP) .................................. 14163371

(51) Int. Cl.
| | | |
|---|---|---|
| C04B 35/505 | (2006.01) | |
| C04B 35/48 | (2006.01) | |
| C04B 35/66 | (2006.01) | |
| C04B 38/00 | (2006.01) | |
| B29B 13/02 | (2006.01) | |
| C04B 35/632 | (2006.01) | |
| C04B 35/638 | (2006.01) | |
| C04B 35/64 | (2006.01) | |

(52) U.S. Cl.
CPC ............. *C04B 35/505* (2013.01); *B29B 13/02* (2013.01); *C04B 35/632* (2013.01); *C04B 35/638* (2013.01); *C04B 35/64* (2013.01); *C04B 35/66* (2013.01); *C04B 38/0058* (2013.01); *C04B 2235/3201* (2013.01); *C04B 2235/3206* (2013.01); *C04B 2235/3208* (2013.01); *C04B 2235/3215* (2013.01); *C04B 2235/3225* (2013.01); *C04B 2235/3232* (2013.01); *C04B 2235/3244* (2013.01); *C04B 2235/3248* (2013.01); *C04B 2235/3272* (2013.01); *C04B 2235/3427* (2013.01); *C04B 2235/602* (2013.01); *C04B 2235/727* (2013.01); *C04B 2235/77* (2013.01); *C04B 2235/80* (2013.01); *C04B 2235/96* (2013.01); *C04B 2235/9615* (2013.01)

(58) Field of Classification Search
CPC .......................... C04B 35/505; C04B 35/481
See application file for complete search history.

(56) References Cited

U.S. PATENT DOCUMENTS

| | | | | |
|---|---|---|---|---|
| 5,712,435 A | * | 1/1998 | Feagin ..................... | B22C 1/00 106/38.22 |
| 5,738,819 A | * | 4/1998 | Feagin ..................... | B22C 1/00 164/15 |
| 5,827,791 A | | 10/1998 | Pauliny et al. | |

FOREIGN PATENT DOCUMENTS

WO    2009142695 A2    11/2009

OTHER PUBLICATIONS

Ramaswamy, et al., "Thermal Barrier Coating Application of Zircon Sand", Journal of Thermal Spray Technology, vol. 8, No. 3, Sep. 1, 1999, pp. 447-453.

* cited by examiner

*Primary Examiner* — Karl Group
(74) *Attorney, Agent, or Firm* — Medley, Behrens & Lewis, LLC

(57) ABSTRACT

The invention relates to a composition (batch) for producing a shaped refractory ceramic product, a method for producing a shaped refractory ceramic product, and a shaped refractory ceramic product.

5 Claims, No Drawings

COMPOSITION FOR PRODUCING A SHAPED REFRACTORY CERAMIC PRODUCT, A METHOD FOR PRODUCING A SHAPED REFRACTORY CERAMIC PRODUCT, AND A SHAPED REFRACTORY CERAMIC PRODUCT

The invention relates to a composition (batch) for producing a shaped refractory ceramic product, a method for producing a shaped refractory ceramic product, and a shaped refractory ceramic product.

As is known, a composition is the term used to describe a compound of one or more components from which a refractory ceramic product can be made by ceramic firing. For the purposes of the invention, the term "refractory ceramic product" denotes in particular ceramic products with a working temperature higher than 600° C., and preferably refractory materials in accordance with DIN 51060, that is to say materials with a pyrometric cone equivalent>SK 17. The pyrometric cone equivalent may be determined particularly in accordance with DIN EN 993-12.

Shaped refractory ceramic products are known particularly in the form of refractory bricks and functional products (construction elements).

One particular application of shaped refractory ceramic products is the use thereof in installations for the thermal treatment of hydrocarbons. In such installations for the thermal treatment of hydrocarbons, hydrocarbons or raw materials that contain hydrocarbons are subjected to thermal treatment in order to transform them into different materials.

A particular embodiment of such installations for the thermal treatment of hydrocarbons is represented by the facilities known as steam crackers, in which hydrocarbons can be cracked particularly to yield acetylene, which in turn can be transformed into many petrochemical products, including in particular ethylene. In such installations, refractory ceramic products sometimes have to withstand operating temperatures of over 2,000° C., sometimes even combined with the rapid changes in the nature of the furnace atmosphere.

It is also possible to crack hydrocarbons at considerably lower temperatures, for example even at temperatures lower than 1,700° C. But at these temperatures the yield of acetylene from the hydrocarbons is significantly lower, and for this reason every effort is made to process the hydrocarbons at temperatures above 2,000° C. if at all possible.

WO 2009/126357 A1 and WO 2010/135073 A2 suggest refractory ceramic products based on yttrium oxide ($Y_2O_3$) for use in installations for the thermal treatment of hydrocarbons. The same documents also describe species-related installation types for the thermal treatment of hydrocarbons in greater detail.

The object underlying the invention is to provide a composition for the production of a shaped refractory ceramic product that is suitable for use in the infeed of installations for the thermal treatment of hydrocarbons. It should be possible to produce shaped refractory ceramic products from the composition that are usable in such installations at an application temperature higher than 2,000° C. Such shaped refractory ceramic products should also be able to withstand an atmosphere that fluctuates between reducing and oxidizing characteristic in rapid succession.

A further object of the invention is to provide a method with which it is possible to produce shaped refractory ceramic products that are capable of being used in such installations under the aforementioned operating conditions.

A further object of the invention is to provide shaped refractory ceramic products that are producible particularly from such a composition and particularly with such a method, and which are usable in the installations described under the aforementioned operating conditions.

To the extent that the invention is based on the object of providing said composition, in order to solve this object according to the invention a composition for producing a shaped refractory ceramic product is provided for installations for the thermal treatment of hydrocarbons that consists of:

85 to 99% by mass $Y_2O_3$ and
1 to 15% by mass $ZrSiO_4$, wherein the values in % by mass are relative to the total mass of the composition in each case.

The starting point for the invention is the fundamental idea that a composition based on yttrium oxide ($Y_2O_3$) might generally be suitable for providing a shaped refractory ceramic product for the infeed for plants for the thermal treatment of hydrocarbons. However, the drawback of using $Y_2O_3$ as the base raw material for producing a shaped refractory ceramic product is that it is practically impossible to sinter $Y_2O_3$ at temperatures that are financially or technically sustainable on an industrial scale. Surprisingly, in the context of invention it has been revealed that when zirconium silicate ($ZrSiO_4$) is used as an additional component in a composition with base of $Y_2O_3$ it is possible to produce a shaped refractory ceramic product for plants for the thermal treatment of hydrocarbons under the conditions that are financially and technically acceptable for a large-scale process, and the product satisfies all of the requirements set forth in the preceding to which such a product is subject.

According to existing information, the advantageous effect of zirconium silicate in a composition based on yttrium oxide is attributable to the following associated factors: above a temperature of about 1,640° C., zirconium silicate begins to decompose into zirconium oxide ($ZrO_2$) and silica ($SiO_2$). However, above this decomposition temperature of 1,640° C. for zirconium silicate, the silicate that is formed from the zirconium silicate is highly reactive and reacts with some of the yttrium of the yttrium oxide in the composition to form one or more yttrium silicates. The yttrium silicate that is formed in turn forms a binder phase for the yttrium oxide. At least some of the $ZrO_2$ that is formed when the zirconium silicate decomposes goes into solution in the resulting yttrium oxide. Accordingly, the composition according to the invention is a reactive binder system in which the components of the composition react with each other starting at a temperature of about 1,640° C. and in which intermediate molten phases occur, which react to form phases that are stable at high temperatures as the reaction progresses. The refractory ceramic product that is formed by this reaction during the ceramic firing is usable well above the sintering temperatures that prevail during the production of the product, in particular even at temperatures higher than 2,000° C.

In particular according to the invention it is provided that yttrium oxide ($Y_2O_3$) is present in the composition according to the invention in a proportion of at least 85% by mass, that is to say for example also in a proportion of at least 86, 87, 88, 89, 90, 91, 92, 93, 94, 95 or 96% by mass. It may further be provided that yttrium oxide is present in the composition according to the invention in proportions not exceeding 99% by mass, that is to say for example also in proportions not exceeding 98.8% by mass, 98.6% by mass, 98.4% by mass, 98.2% by mass, 98% by mass, 97.8% by mass, 97.6% by mass, 97.4% by mass, 97.2% by mass or 97% by mass.

Unless otherwise indicated, the values in % by mass given in this document refer to the total mass of the composition in each case.

Further, the values referring to the "grain size" given in this document refer to the grain size of the corresponding raw materials for yttrium oxide and zirconium silicate.

The grain size of the yttrium oxide in the composition according to the invention is preferably entirely or with a grain size $D_{90}$ (that is to say with 90% by mass relative to the total mass of the respective composition) less than 4.0 mm, that is to say for example also entirely less than 3.5 or less than 3.15 mm.

For example yttrium oxide is present with grain sizes in the composition entirely or with a grain size $D_{90}$ in the following proportions by mass, relative to the total mass of yttrium oxide in the composition according to the invention in each case:

<4.0 mm: 100% by mass;
<3.5 mm: 100% by mass;
<3.15 mm: 100% by mass;
<2.0 mm: at least 80, 81, 82 or 83% by mass. Not more than 88, 87, 86 or 85% by mass;
<1.4 mm: at least 70, 71, 72 or 73% by mass. Not more than 78, 77, 76, 75 or 74% by mass;
<1.0 mm: at least 60, 61, 62, 63 or 64% by mass. Not more than 70, 69, 68, 67, 66 or 65% by mass;
<0.5 mm: at least 45, 46, 47, 48 or 49% by mass. Not more than 55, 54, 53, 52, 51 or 50% by mass;
<0.2 mm: at least 30, 31, 32, 33 or 34% by mass. Not more than 38, 37, 36 or 35% by mass;
<0.1 mm: at least 20, 21, 22, 23, 24, 25 or 26% by mass. Not more than 31, 30, 29, 28 or 27% by mass.

For example it may be provided that yttrium oxide is present within the grain size limits indicated hereafter in the respective proportions by mass, relative to the total mass of yttrium oxide in the composition according to the invention in each case:

2.0 to <3.15 mm: at least 10, 11, 12, 13, 14 or 15% by mass. Not more than 21, 20, 19, 18 or 17% by mass. For example 16% by mass.
1.4 to <2.0 mm: at least 7, 8, 9 or 10% by mass. Not more than 15, 14, 13 or 12% by mass. For example 11% by mass.
1.0 to <1.4 mm: at least 6, 7 or 8% by mass. Not more than 12, 11 or 10% by mass. For example 9% by mass.
0.5 to <1.0 mm: at least 10, 11, 12, 13 or 14% by mass. Not more than 20, 19, 18, 17 or 16% by mass. For example 15% by mass.
0.1 to <0.5 mm: at least 10, 11, 12, 13 or 14% by mass. Not more than 20, 19, 18, 17 or 16% by mass. For example 15% by mass.
0.1 to <0.2 mm: at least 5, 6 or 7% by mass. Not more than 11, 10 or 9% by mass. For example 8% by mass.
>0 to <0.1 mm: at least 20, 21, 22, 23, 24 or 25% by mass. Not more than 31, 30, 29, 28 or 27% by mass. For example 26% by mass.

$ZrSiO_4$ (zirconium silicate) may be present in the composition for example in a proportion of at least 1% by mass, that is to say for example also in a proportion of at least 1.2% by mass, 1.4% by mass, 1.6% by mass, 1.8% by mass, 2% by mass, 2.2% by mass, 2.4% by mass, 2.6% by mass, 2.8% by mass or 3% by mass. $ZrSiO_4$ may be present in the composition according to the invention for example in a proportion not exceeding 15% by mass, that is to say for example also in a proportion not exceeding 14, 13, 12, 11, 10, 9, 8, 7, 6, 5 or 4% by mass.

According to the invention, it may particularly be provided that the grain size of the $ZrSiO_4$ in the composition is entirely or with $D_{90}$ less than 1.0 mm, that is to say entirely or with $D_{90}$ the grain size is for example also less than 0.5 mm, 0.1 mm, 0.05 mm, 0.03 mm, 0.02 mm or 0.01 mm.

It has been found according to the invention that many substances that are commonly present in compositions for producing refractory ceramic products have a negative effect on the refractoriness of the shaped refractory ceramic product produced from the composition according to the invention. In particular, these substances are the oxides $TiO_2$ (titanium dioxide), $Fe_2O_3$ (iron oxide), and oxides of the alkali and alkaline earth metals, particularly $Na_2O$, $K_2O$, CaO, MgO und BaO.

According to the invention, it may therefore be provided that the composition contains at least one of these oxides or a total of these oxides in amounts not exceeding the following maximum proportions:

$TiO_2 \leq 0.15$% by mass;
$Fe_2O_3 \leq 0.15$% by mass;
$Na_2O + K_2O \leq 0.15$% by mass;
$CaO + MgO + BaO \leq 0.20$% by mass.

Alumina ($Al_2O_3$) may also have an undesirable effect on the sintering of the composition according to the invention, but small quantities of this substance in the composition are tolerable. It may be provided according to the invention that the composition contains proportions of less than 3% by mass of $Al_2O_3$, that is to say for example also less than 2.5% by mass, 2% by mass, 1.5% by mass, 1% by mass, 0.5% by mass or 0.1% by mass.

A shaped refractory ceramic product with particularly excellent properties for use in installations for the thermal treatment of hydrocarbons may then be prepared from the composition according to the invention particularly if such composition contains practically no components, or only very small quantities thereof, other than yttrium oxide and zirconium silicate. According to one embodiment, it is provided that the composition according to the invention only contains a total of less than 5% by mass of components other than yttrium oxide and zirconium silicate, that is to say for example also less than 4% by mass, 3% by mass, 2% by mass, 1% by mass, 0.8% by mass, 0.6% by mass, 0.5% by mass, 0.4% by mass, 0.3% by mass, 0.2% by mass or 0.1% by mass. If the composition according to the invention contains other components besides yttrium oxide and zirconium silicate, these may be introduced into the composition particularly via natural impurities.

In order to ensure that the smallest possible quantities of components other than yttrium oxide and zirconium silicate are present in the composition, it is preferably provided that yttrium oxide and zirconium silicate are each present in the composition as raw materials in highly pure form.

The subject matter of the invention is also a method for producing a shaped refractory ceramic product from a composition according to the invention, comprising the following steps:

Providing a composition according to the invention;
Mixing the composition with a binder;
Moulding the composition mixed with a binder into a shaped body;
Firing the shaped body to form a shaped refractory ceramic product.

Mixing of the composition according to the invention with a binder is done in order to lend the composition a mouldable consistency. Mixing the composition with a binder enables the composition to be moulded into a shaped body (green body) with sufficient inherent stability so that it is subsequently able to undergo further processing without losing its shape.

In general, the composition according to the invention can be mixed with any of the binders that are known from the prior art for compositions based on an oxide for refractory materials. The composition according to the invention is preferably mixed with an organic binder, for example at least one of the following binders: dextrin, fruit acid, sugar or polyvinyl alcohol.

The composition may be mixed with a binder for example in a quantity of at least 0.2% by mass, that is to say for example also with a quantity of at least 0.3% by mass, 0.4% by mass or 0.5% by mass. The composition may be mixed with a binder in a quantity not exceeding for example 2% by mass, that is to say for example also with a quantity not exceeding 1.5% by mass, 1% by mass, 0.8% by mass or 0.6% by mass. In each case, the values regarding the mass of the binder are relative to the total mass of the composition without the binder, that is to say relative to 100% by mass of the composition without the binder.

Oxide-based compositions are often mixed with a phosphate binder in refractory technology. However, it has been found in the context of the invention that phosphorus or phosphorus-containing compounds can have a negative effect on the sintered shaped refractory ceramic product according to the invention. Therefore, it may be provided to use no binders in the form of a phosphate binder. It may also be provided that the composition contains phosphorus (calculated in the form of $P_2O_5$) in quantities not exceeding 0.1% by mass, that is to say for example also in quantities not exceeding 0.05% by mass, or 0.01% by mass.

The composition mixed with a binder may be mixed before it is shaped, in a compulsory mixer for example.

The shaping of the composition mixed with a binder to form a shaped body (green body) is preferably carried out by compressing.

The shaped body may be dried before firing, for example at a temperature in the range from 110 to 250° C.

The firing of the shaped body to produce a shaped refractory ceramic product is a ceramic firing process in which the components of the composition are sintered together with each other to produce a refractory ceramic product. By firing the shaped body, a correspondingly sintered shaped refractory ceramic product is obtained.

The composition, or the shaped body produced from the composition, is fired for example at temperatures in excess of 1,640° C., and preferably at a temperature of at least 1,700 or 1,750° C. and at temperatures not above 1,850° C. or 1,800° C. for example.

Firing is carried out for example for a period in the range from 6 to 8 hours for example.

A further object of the invention is a shaped refractory ceramic product that is produced particularly by the method according to the invention.

As was explained earlier, the composition according to the invention is a reactive binder system in which the components react with each other during the ceramic firing to form the reaction products described in the preceding. Accordingly, the subject matter of the invention is also a shaped refractory ceramic product comprising the following phases:
  $Y_2O_3$;
  $Y_2O_3$—$ZrO_2$ solid solutions; and
  yttrium silicates.

The phases described in the preceding are characteristic of a shaped refractory ceramic product that has been produced from a composition according to the invention. The main phase of the product is yttrium oxide ($Y_2O_3$) that is sintered with a binder phase in the form of yttrium silicates. $Y_2O_3$—$ZrO_2$ solid solutions are also present.

The shaped refractory ceramic product according to the invention may also contain at least one of the following phases: $ZrO_2$ (as a product of the decomposition of $ZrSiO_4$) and zirconium silicate (small residual quantities that have not decomposed).

If yttrium silicates are present in the shaped refractory ceramic product according to the invention, these may be one or more of the following yttrium silicates: $Y_2SiO_5$ ($SiO_2.Y_2O_3$), $Y_2Si_2O_7$ ($2SiO_2.Y_2O_3$) or $Y_4Si_3O_{12}$ ($3SiO_2.2Y_2O_3$).

The product according to the invention may contain the phases $Y_2O_3$ and $Y_2O_3$—$ZrO_2$ solid solution for example in a proportion of at least 76.5% by mass, that is to say for example in a proportion by mass of at least 78, 80, 82, 84, 86, 88, 90, 92, 94 or 95% by mass, relative in each case to the total mass of the product according to the invention. For example, the total mass of $Y_2O_3$ and $Y_2O_3$—$ZrO_2$ solid solution in the product according to the invention may be a quantity not exceeding 98.5% by mass, that is to say for example also not exceeding 98% by mass, 97.5% by mass, 97% by mass, 96.5% by mass or 96% by mass, relative in each case to the total mass of the product according to the invention.

The mass of yttrium silicate in the product according to the invention may be for example at least 1.5% by mass, that is to say for example also at least 2% by mass, 2.5% by mass, 3% by mass, 3.5% by mass or 4% by mass, relative in each case to the total mass of the product according to the invention. The mass of yttrium silicate in the product according to the invention may be for example in a quantity not exceeding 23.5% by mass, that is to say for example also in a quantity not exceeding 20, 18, 16, 14, 12, 10, 8, 7, 6 or 5% by mass, relative in each case to the total mass of the product according to the invention.

It may be provided according to the invention that the total mass of the phases other than $Y_2O_3$, $Y_2O_3$—$ZrO_2$ solid solution, yttrium silicate, $ZrO_2$ und $ZrSiO_4$ that are present in the product according to the invention is less than 5% by mass, that is to way for example also less than 4% by mass, 3% by mass, 2% by mass, 1% by mass, 0.8% by mass, 0.6% by mass or 0.5% by mass, relative in each case to the total mass of the product according to the invention.

The shaped refractory ceramic product according to the invention is notable for excellent refractory properties. The product according to the invention may for example exhibit at least one of the following physical properties:
  Cold compressive strength [MPa]: ≥40, ≥45, ≥50, ≥55 and for example ≤100, ≤90, ≤80, ≤70, ≤60;
  Gas permeability [nPm]: ≥2.8, ≥2.9, ≥3 and for example ≤3.5, ≤3.4, ≤3.3;
  Bulk density [g/cm$^3$]: ≥3.9, ≥3.91, ≥3.92, and for example ≤4.02, ≤4.01, ≤4.0, ≤3.99, ≤3.98, ≤3.97, ≤3.96, ≤3.95, ≤3.94;
  Open porosity [% by vol.]: ≥14, ≥15, ≥16, ≥17, and for example ≤24, ≤23, ≤22, ≤21, ≤20, ≤19;
  Refractoriness under load $T_0$ [° C.]: ≥1,600, ≥1,620, ≥1,640, ≥1,660, ≥1,680;
  Refractoriness under load $T_{0.5}$ [° C.]: ≥1,680, ≥1,685, ≥1,690, ≥1,695, ≥1,700;
  Permanent change in length at 2,000° C. [lin %]: ≤−0.5, ≤−0.6, ≤−0.7, ≤−0.8, ≤−0.9, ≤−1.0.

Cold compressive strength is determined according to DIN EN 993-5:1998.

Gas permeability is determined according to DIN EN 993-4:1995.

Bulk density is determined according to DIN EN 993-1:1995.

Open porosity is determined according to DIN EN 993-1:1995.

Refractoriness under load is determined according to DIN EN 1893:2008.

Permanent change in length is determined according to DIN EN 993-10:1998.

The product according to the invention may be used in installations showing strong variations of atmospheric conditions (e.g. reducing/oxidizing atmosphere) at high temperatures (e.g. >1,800° C.). In particular, the products according to the invention may be used for the infeed in such installations in which the products are exposed to an operating temperature higher than 2,000° C.

Further, the products of the invention may be used in petrochemical installations, especially in cracking processes or petrochemical crackers, respectively.

Generally, the products of the invention may be used in processes with high temperatures. For examples, the products of the invention may be used in processes in which they are exposed to temperatures above 2,000° C.

According to one embodiment, the products of the invention may be used in installations and for methods used for the production of carbon black, for example in the lamp-black, gas-black, furnace-black or acetylene black method.

According to another embodiment, the products of the invention may be used as material for firing nozzles, i.e. burner nozzles.

According to one embodiment, a composition according to the invention includes the following components in the following proportions by mass:

$Y_2O_3$:97% by mass;
$ZrSiO_4$:3% by mass.

The $Y_2O_3$ has a grain size entirely smaller than 3.15 mm and the $ZrSiO_4$ has a grain size entirely smaller than 0.01 mm.

According to one embodiment of the method according to the invention, the composition according to the embodiment is mixed with 0.5% by mass binder relative to 100% by mass of the composition without binder, the binder being in the form of dextrin, and the mixture is then mixed in a compulsory mixer. The mixture of composition and binder was then moulded to form a shaped body by compression, then dried at 150° C. and finally fired at 1,800° C. for a period of seven hours to produce a shaped refractory ceramic product.

The sintered product that is produced in this way includes the following phases in the following proportions by mass, relative in each case to the total mass of the product:

Total of $Y_2O_3$ and $Y_2O_3$—$ZrO_2$ solid solution: 95.34% by mass;

Yttrium silicate: 4.66% by mass.

The physical properties of the product produced by the method of the example are as follows:

Cold compressive strength [MPa]: 58.8;
Gas permeability [nPm]: 3.15;
Bulk density [g/cm$^3$]: 3.98;
Open porosity [% by vol.]: 20.4;
Refractoriness under load $T_0$ [° C.]: 1,688;
Refractoriness under load $T_{0.5}$ [° C.]: >1,699;
Permanent change in length at 2,000° C. [lin %]: −1.04.

The invention claimed is:

1. A composition for producing a shaped refractory ceramic product comprising:
   85 to 99% by mass $Y_2O_3$; and
   1 to 15% by mass $ZrSiO_4$;
   relative to the total mass of the composition in each case.

2. The composition according to claim 1, in which the $Y_2O_3$ present has a grain size smaller than 4.0 mm.

3. The composition according to claim 1, in which the $ZrSiO_4$ present has a grain size smaller than 1.0 mm.

4. The composition according to claim 1, which contains at least one of the following oxides or the sum of oxides in the maximum proportions indicated in each case:
   $TiO_2 \leq 0.15\%$ by mass;
   $Fe_2O_3 \leq 0.15\%$ by mass;
   $Na_2O+K_2O \leq 0.15\%$ by mass;
   $CaO+MgO+BaO \leq 0.20\%$ by mass;
   relative to the total mass of the composition in each case.

5. A method for producing a shaped refractory ceramic product from a composition, which method comprises the following steps:
   providing a composition, the composition comprising:
     85 to 99% by mass $Y_2O_3$; and
     1 to 15% by mass $ZrSiO_4$; relative to the total mass of the composition in each case;
   mixing the composition with a binder;
   moulding the composition mixed with a binder into a shaped body; and
   firing the shaped body to form a shaped refractory ceramic product.

* * * * *